United States Patent [19]
Ebrahim et al.

[11] Patent Number: 5,893,121
[45] Date of Patent: Apr. 6, 1999

[54] SYSTEM AND METHOD FOR SWAPPING BLOCKS OF TAGGED STACK ENTRIES BETWEEN A TAGGED STACK CACHE AND AN UNTAGGED MAIN MEMORY STORAGE

[75] Inventors: Zahir Ebrahim, Mountain View; Ahmed H. Mohamed, Berkeley, both of Calif.

[73] Assignee: Sun Microsystems, Inc., Mountain View, Calif.

[21] Appl. No.: 841,525

[22] Filed: Apr. 23, 1997

[51] Int. Cl.[6] ........................................ G06F 17/30
[52] U.S. Cl. .................. 707/206; 395/392; 711/132; 711/136
[58] Field of Search .............................. 707/206; 711/132, 711/136; 395/392

[56] References Cited

U.S. PATENT DOCUMENTS

| | | | |
|---|---|---|---|
| 4,530,049 | 7/1985 | Zee .......................................... | 364/200 |
| 4,757,438 | 7/1988 | Thatte et al. ............................. | 364/200 |
| 4,907,151 | 3/1990 | Bartlett .................................... | 364/200 |
| 4,920,483 | 4/1990 | Pogue et al. ............................. | 364/200 |
| 4,928,239 | 5/1990 | Baum et al. ............................. | 364/200 |
| 5,043,870 | 8/1991 | Ditzel et al. ............................. | 364/200 |
| 5,107,457 | 4/1992 | Hayes et al. ............................. | 395/800 |
| 5,222,221 | 6/1993 | Houri et al. ............................. | 395/375 |
| 5,301,288 | 4/1994 | Newman et al. ........................ | 395/400 |
| 5,355,483 | 10/1994 | Serlet ...................................... | 395/650 |
| 5,408,650 | 4/1995 | Arsenault ................................ | 395/575 |
| 5,535,329 | 7/1996 | Hastings ............................. | 395/183.11 |
| 5,560,003 | 9/1996 | Nilsen et al. ............................ | 395/600 |
| 5,561,786 | 10/1996 | Morse ................................ | 395/497.01 |
| 5,566,321 | 10/1996 | Pase et al. ............................... | 395/480 |
| 5,765,035 | 6/1998 | Tran ........................................ | 395/392 |

OTHER PUBLICATIONS

Moon, David A., "Garbage Collection in a Large Lisp System", *ACM* (1984), pp. 235–246.

Aho, Alfred V., et al., "Compliers Principles, Techniques, and Tools", *Addison–Wesley*, Mar. 1988, Ch. 10, pp. 585–586, 592–599, 605–607.

Karen, et al., "Garbage Collection for Prolog Based on WAM", *Communications of the ACM*, vol. 31, Issue 6 (Jun. 1, 1988).

Courts, Robert, "Improving Locality of Reference in a Garbage–Collecting Memory Management System", *Communications of the ACM*, Vo. 31, No. 9 (1988), pp. 1128–1138.

Grehan, Rick, "Hands On, Some Assembly Required; If Memory Serves . . . ", *Byte* (Aug. 1989), pp. 279–280, 282, 284, 337.

(List continued on next page.)

*Primary Examiner*—Thomas G. Black
*Assistant Examiner*—Jean M. Corrielus
*Attorney, Agent, or Firm*—Gary S. Williams; Flehr Hohbach Test Albritton & Herbert LLP

[57] ABSTRACT

A computer system has a CPU, a stack cache and a main memory. The main memory is a conventional untagged memory, where each memory location is a word having a bit size that is an integer power of 2 (e.g., 32, 64 or 128 bits per word). However, at least one stack cache associated with the CPU (and preferably integrated with the CPU on the same semiconductor circuit or in the same chip set) is a tagged memory where each data word of the stack cache has an associated tag. Whenever the stack cache overflows with data, at least a portion of the contents of the stack cache are stored in a previously established location in main memory so as to make room for storing additional data in the stack cache. In this stack cache swap out operation, the data values and tags in N evaluation stack entries of the evaluation stack cache are copied to the previously established main memory location. The N tags in the N copied evaluation stack entries are stored into a first predefined portion of the previously established main memory location, and the N data values in the N copied evaluation stack entries are stored into a second predefined portion of the previously established main memory location. During a cache fill operation, the N tags and data values of a stack block are copied from their respective main memory positions into the tag and data portions of a stack cache block.

18 Claims, 9 Drawing Sheets

OTHER PUBLICATIONS

Grehan, Rick, "Hands On, Some Assembly Required; Virtually Virtual Memory", *Byte* (Sep. 1990), p. 455–456, 458, 460, 462, 464.

Kuechlin, Wolfgang W., "On Multi–Threaded List–Processing and Garbage Collection", *IEEE* (1991), pp. 894–897.

Booch, Gardy, "Object Oriented Design with Applications", *Benjamin/Cummings* (1991).

Imai, Akira, et al., "Evaluation of Parallel Copying Garbage Collection on a Shared–Memory Multiprocessor", *IEEE* (1993), pp. 1030–1040.

Holze, Urs, et al., "A Fast Write Barrier for Generational Garbage Collectors", *OOPSLA '93 Garbage Collection Workshop* (Oct. 1993).

Bott, Ed, Windows; Windows' Invisible Wall: The 64K Barrier, System Resources are the Hidden Memory Limit That Microsoft Forgot:, *PCContact* (Mar. 1994), pp. 210, 212.

Shaw, Richard Hale, "An Introduction to the Win32 API", *PC Magazine* vol. 13, No. 8, pp. 291–295, Apr. 26, 1994.

Barrett, David A., "Improving the Performance of Coservative Generational Garbage Collection", 1995 Thesis.

Wilson, Paul R., et al., "Dynamic Storage Allocation: A Survey and Critical Review", *University of Texas at Austin*, 1995.

Jones, Richard et al., "Garbage Collection, Algorithms for Automatic Dynamic Memory Management", *John Wiley &Sons* (1996).

Gadbois, David et al., "GC FAQ", *http://www.centerline.com/people/chase/GC/GC–faq.html* (Jan. 6, 1997).

Caro, Alejandro, "A Novel 64 Bit Data Representation for Garbage Collection and Synchronizing Memory", *Computation Structures Group Memo 396* (Apr. 9, 1997).

Harbaugh, Sam et al., "HeapGuard™, Eliminating Garbage Collection in Real–Time Ada Systems", *Integrated Software, Inc.*, pp. 704–708, no date.

Wallace, David Vinayak et al., "Simple Garbage Collection in G++", Draft, Rev. 1.1, no date.

Jones, Richard et al., "Garbage Collection, Algorithms for Automatic Dynamic Memory Management", *John Wiley & Sons*, Chs. 6, 7 and 8, no date.

Root Set Locator Procedure
300

310 Locate object references in registers, and add located object references to root set list.

312 Locate object references in program stack, and add located object references to root set list.

314 Locate object references in evaluation stack, including both cache and memory portions, and add located object references to root set list.

FIG. 5

SYSTEM AND METHOD FOR SWAPPING BLOCKS OF TAGGED STACK ENTRIES BETWEEN A TAGGED STACK CACHE AND AN UNTAGGED MAIN MEMORY STORAGE

The present invention relates generally to "garbage collection" systems and methods that automatically recover memory used by objects no longer in use by the operating system and application programs in a computer system, and more particularly to a system and method for efficiently locating object references in the program stack during garbage collection.

BACKGROUND OF THE INVENTION

Basic Explanation of Garbage Collection

Garbage collection is a complex topic that has been the subject of hundreds of technical articles and at least one text book. The following is a simplified explanation of dynamic memory allocation and garbage collection. For a more complete explanation of basic garbage collection technology, see U.S. Pat. No. 5,088,036, and Richard Jones and Rafael Lins, "Garbage Collection," John Wiley & Sons Ltd., 1996, both of which are incorporated by reference as background information.

Referring to FIG. 1, there is shown a typical multitasking computer system 100 that has a CPU 102, user interface 106, and memory 108 (including both fast random access memory and slower non-volatile memory). The memory 108 stores an operating system 110 and one or more mutator tasks 112 (also called processes or threads). Each active task in the system is assigned a portion of the computer's memory, including space for storing the application level code 112 executed by the task, space for storing a program stack 114, and a heap 116 that is used for dynamic memory allocation.

The CPU 102 includes an instruction cache 120 for providing instructions to an instruction decoder and execution logic 122. The CPU also includes a stack cache 124 for storing in high speed cache memory a portion of the program stack 114, and a set of registers 126 for storing data values, object references 128 and the like. The program stack 114, including the portion in the stack cache 124, is used to temporarily store various data structures and parameters, including activation records (sometimes called "frames") 130 that are pushed on the program stack each time a method or other procedure is invoked.

During garbage collection, the program stack 114, and the registers 126 in the CPU 102 are typically used to locate a "root set" of object references or pointers used by the mutator task 112. A root set locator procedure in the garbage collector will typically generate and store a root set list 132 of the located root set object references.

It should be understood that FIG. 1 depicts only a simplified representation of a CPU 102 and the items stored in memory. Also, it should be understood that multiple processes may be executing simultaneously in a computer system, each with its own address space that includes the same types of items as shown in the memory 108 of FIG. 1.

For the purposes of this description, the terms "task", "mutator", "mutator thread", "thread" and "process" are used interchangeably. Tasks and programs are sometimes called mutators because they change or "mutate" the contents of the heap 116.

The term "object" is herein defined to mean any data structure created by a program or process.

The terms "reference" and "object reference" are used interchangeably to describe a data structure that includes a pointer to an object. While the term "pointer" or "object pointer" are sometimes used interchangeably with "reference" and "object reference", object references may include information in addition to a pointer. An object reference may be direct or indirect. A direct object reference directly points to an object header, while an indirect object reference points to an object handle. In this document the term "object reference" refers to both types.

The term "stack cache overflow" is defined for the purpose of this document to mean either that the relevant stack cache has become full and the CPU is requesting to write additional entries to it, or that the number of entries in the stack cache equals or exceeds a predefined or programmable "high water mark" (or equivalently, the number of unused entries in the stack cache falls below a predefined or programmable value).

The term "stack cache underflow" is defined for the purpose of this document to mean either that the relevant stack cache has become empty and the CPU is requesting further stack cache entries from it, or that the number of used entries in the stack cache falls below a predefined or programmable "low water mark" (or equivalently, the number of unused entries in the stack cache exceeds a predefined or programmable value).

The term "in-band memory tagging" refers to storing stack cache tags in-band in memory, as a header word preceeding N datum words. The term "out-band memory tagging" refers to storing stack cache tags in a header for N datum words in an alternate location in memory from the location used to store the N datum words.

When the mutator task 112 associated with the heap 116 needs space for storing an array or other program "object", a Memory Allocator routine 140 in the operating system is called. The memory allocator 140 responds by allocating a block of unused memory in the heap 116 to the task. Additional requests for memory will result in the allocation of additional memory blocks. Clearly, if the task continues to ask for more memory, all the space in the heap 116 will eventually be used and the task will fail for lack of memory. Therefore space must be restored by either explicit actions of the program, or some other mechanism.

It is well known that most tasks "abandon" much of the memory space that is allocated to them. Typically, the task stores many program objects in allocated memory blocks, and discards all references to many of those objects after it has finished processing them because it will never need to access those objects again. An object for which there are no references (sometimes called pointers) is often termed an "inaccessible object", and the memory space it occupies is "inaccessible" to the task that once used it.

The solution to this problem is to recover blocks of memory space in the heap 116 that are no longer being used by the task. Garbage collection is the term used to refer to automatic methods of recovering unused memory in the heap 116. The garbage collector generally gathers and recovers unused memory upon the occurrence of a predefined event, such as the expiration of a predefined time period, or usage of a certain amount of the available heap. Thus, FIG. 1 shows that the operation system 110 includes a garbage collector 142.

Thus, the purpose of the garbage collector 142 is to recover unused or abandoned portions of memory in the heap 116 so that the task using the heap will not run out of memory.

While there are a number of different garbage collection methodologies, the easiest one to explain is the Stop and Copy garbage collection technique. In this scheme the heap is divided into two halves, also called semi-spaces, and the program uses only one semi-space at a time. Stop and Copy garbage collectors reclaim unused memory and compact the program accessible memory used by a task by copying all "accessible objects" in the current semi-space to a contiguous block of memory in the other semi-space, and changing all references to the accessible objects so as to point to the new copy of these objects. An accessible object is any object (i.e., block of memory) that is referenced, directly or indirectly, by the "roots" or "root set" of the task. Typically, the "root set" of a task with respect to garbage collection is a set of object references stored in known locations, in the program stack 114 and registers 126 used by the task, which point to objects used by a task. Many of those objects, in turn, will contain references to other objects used by the task. The chain, or directed graph, of object references emanating from the root set indirectly points to all of the accessible objects in the heap.

The entire set of objects referenced by these object references (pointers) is called the set of accessible objects. Inaccessible objects are all objects not referenced by the set of object references derived from the root set.

By copying all accessible objects to a new contiguous block of memory in the heap, and then using the new copy of the objects in place of the old copy, the Stop and Copy garbage collector eliminates all unused memory blocks in the heap. It also "compacts" the memory storage used by the task so that there are no "holes" between accessible objects. Compaction is a desirable property because it puts all of the memory available for allocation to a task in a contiguous block, which eliminates the need to keep track of numerous small blocks of unallocated memory. Compaction also improves virtual memory performance.

Also shown in FIG. 1 are aspects of a computer system that is set up to execute "Java™" (a trademark of Sun Microsystems, Inc.) bytecode programs. In particular, the operating system of such a system includes:

a bytecode program verifier 144 for verifying whether or not a specified Java bytecode program satisfies certain predefined integrity criteria;

a class loader 146, which loads object classes into a user's address space and utilizes the bytecode program verifier 144 to verify the integrity of the methods associated with each loaded object class; and a bytecode program interpreter (not shown) for executing Java bytecode programs. If the instruction decoder and execution logic 122 is designed to execute Java bytecode instructions, a bytecode program interpreter is not needed.

Furthermore, in a computer system set up to execute Java bytecode programs, memory 108 will include at least one class repository 150, for locally storing object classes 152 in use and/or available for use by users of the computer system 100. The heap 116 acts as an object repository for storing objects, which are instances of objects of the object classes stored in the class repository 150.

The present invention is equally applicable to systems using incremental garbage collection, which is a collection of techniques for performing garbage collection in a manner that is interleaved in small increments with mutator functions. Incremental garbage collection is used primarily in systems that require real-time system performance. In most copying versions of incremental garbage collection, every time an existing object is accessed, the existing object is copied from old space to new space unless the object has already been moved to new space during the current collection cycle. There are also non-copying and non-compacting versions of incremental garbage collection. Incremental garbage collection reduces the length of any single system pause caused by garbage collection, but may increase latency in the execution of individual mutator task instructions. The procedure or set of instructions used for performing incremental garbage collection are sometimes called "read barrier" instructions, since they are typically performed in conjunction with object field read instructions. Incremental collection may also be performed using write barrier instructions, which are typically performed in conjunction with object reference write instructions.

The present invention is also equally applicable to: any garbage collection system in which the evaluation stack is part of the root set, and to any tracing garbage collection system.

When a computer system supports multithreading, it is possible for two or more threads of execution to share a single address space. In such systems, each thread of execution is typically considered to be a separate mutator task, and each has its own stack and register set.

In computer systems that use tagged memory to facilitate efficient garbage collection, every word of memory has a corresponding tag that specifies whether or not the value stored in the memory word is an object reference. Of course, in such systems it is necessary that the CPU be able to determine, while it is executing each instruction that changes the contents of any memory location, stack location or register, whether or not the value being written is an object reference. For this reason the instructions used by such computer systems are generally sufficiently data type specific that all instructions, other than instructions which copy values from one memory location to another, that can write an object reference, are only used to write object reference values (i.e., they are data type specific for handling only object reference data).

The identification of object references in the program stack is a tedious time consuming task in non-tagged memory based computers. Further, making a CPU or operating system compatible with non-tagged memory is usually considered to be desirable because virtually all desktop and workstation computers use memory with a standardized word width, such as 32, 64 or 128 bits per word. Also, updating an explicit main memory tag can incur expensive read-modify-write cycle operations, thus reducing available memory bandwidth.

Prior to the present invention there has been an implicit assumption that if tagged main memory was not available, then cache memory inside the CPU should be untagged since it was assumed that there was no point in tagging one without the other. However, given the well known advantages of using tagged memory for garbage collection, the present invention provides a system and method for using tagged stack cache memory inside a computer's CPU while using conventional untagged main memory outside the CPU.

One last point of background information is that the prior art provides a number of examples, other than object reference marking, in which the tagging of memory is useful. It is beyond the scope of this document to explain the details of such systems, because the preferred embodiment of the present invention is specifically addressed at making root set location efficient in object oriented computer systems that use automatic garbage collection for storage management.

However, suffice it to say that most aspects of the present invention are applicable to any computer system or operating system that uses conventional, untagged main memory, but where using tagged cache memory in the CPU would be desirable.

SUMMARY OF THE INVENTION

In summary, the present invention is a computer system having a CPU having at least one stack cache and a main memory. Main memory is a conventional untagged memory, where each memory location is a word having a bit size that is an integer power of 2 (e.g., 32, 64 or 128 bits per word). However, at least one stack cache associated with the CPU (and preferably integrated with the CPU on the same semiconductor circuit or in the same chip set) is a tagged memory where each data word of the stack cache has an associated tag. Each tag consists of T bits, where T may be as small as 1.

Whenever the stack cache overflows with data, at least a portion of the contents of the stack cache are stored in a previously established location in main memory so as to make room for storing additional data in the stack cache. In a stack cache spill operation (also called a "swap out" operation), an entire stack cache block of N stack cache entries is copied to the previously established main memory location. The tags in the N copied evaluation stack entries are stored into a first predefined portion of the previously established main memory location, and the data values in the N copied evaluation stack entries are stored into a second predefined portion of the previously established main memory location. However, whether or not a spilled stack cache block is actually copied to main memory at all may depend on the cache policy being used, such as whether the stack cache is a write-through or writeback cache, and for the latter whether it maintains a dirty bit to avoid writing back clean (i.e., unmodified) stack cache blocks.

During a cache fill operation, the tags and data values of a stack block are copied from their respective main memory positions into the tag and data portions of a stack cache block.

In a second embodiment, stack cache blocks are swapped out to two areas in main memory, with one set of main memory locations being used to store swapped out stack cache tags and a second set of main memory locations being used to store swapped out stack cache data.

In a third embodiment, stack cache blocks are swapped out to a data cache, where each stack cache block preferably fits into a single data cache line. As a result, the management of the stack cache piggy backs on the standard mechanisms used for handling the computer system's data cache(s).

BRIEF DESCRIPTION OF THE DRAWINGS

Additional objects and features of the invention will be more readily apparent from the following detailed description and appended claims when taken in conjunction with the drawings, in which:

FIG. 5 is a flow chart of a root set locator procedure.

DESCRIPTION OF THE PREFERRED EMBODIMENTS

Figure 1:
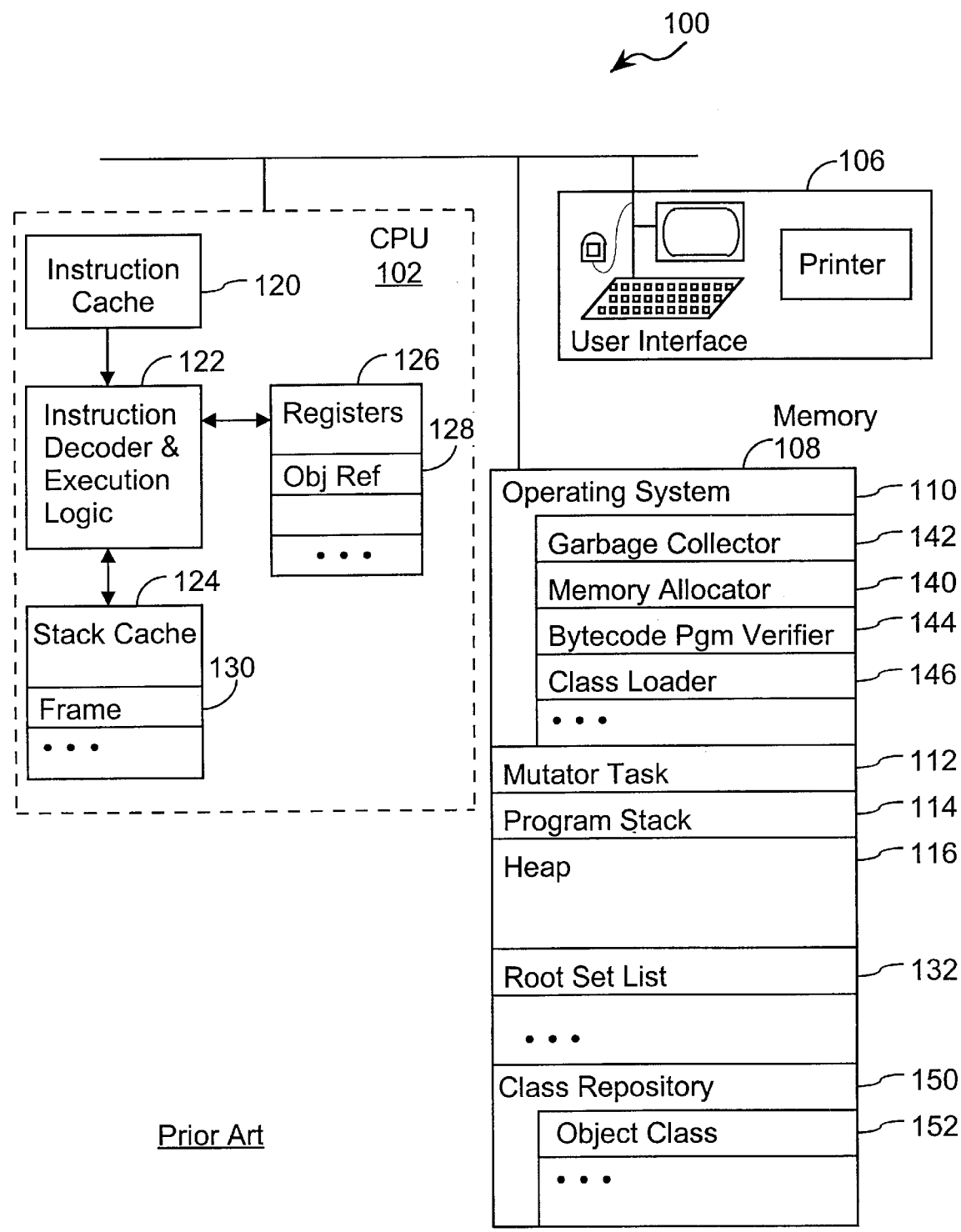
FIG. 1 is a block diagram of a computer system that utilizes garbage collection for recovery of memory space used by inaccessible objects.
Figure 2A:
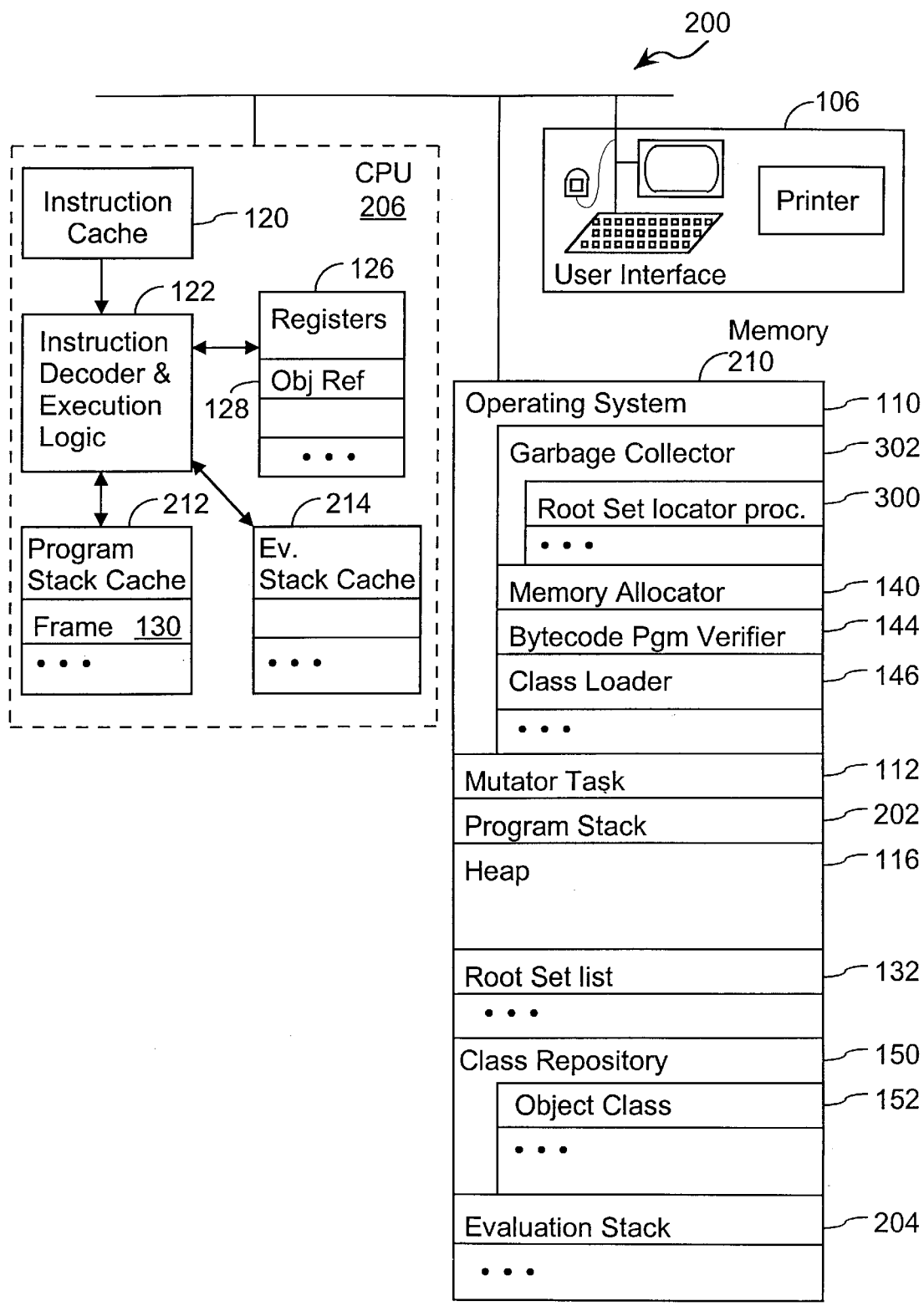
FIG. 2A is a block diagram of a computer system in a preferred embodiment of the present invention.

Referring to FIG. 2A, in a preferred embodiment a computer system 200 incorporating the present invention the stack or program stack 124 is divided into two stacks: a program stack 202 that is used only for storing method activation records, and an evaluation stack 204 that is used for temporarily storing data related to computational operations. In other words, the evaluation stack 204 stores everything normally stored in a stack other than method activation information.

For the purposes of this document, the method activation record is defined to include the arguments passed to the method, the local variables of the method, and state information that enables the method to return to its caller as well as any other state information generated by the compiler. For the sake of clariy, we do not show any return values from the method in the Figures, but typically the returning method would leave such return values at the top of the evaluation or operand stack in the caller's environment or as specified by the compiler.

For the purposes of this document, the term "method" is used to refer methods (i.e., object class methods) as well as procedures and functions, and the term "method activation record" is used to refer to the record pushed on a stack when any method, procedure or function is called or invoked. While the preferred embodiment is described with respect to a computer system executing Java bytecode methods, the invention is equally applicable to systems executing programs written in other languages, such as C and C++, and to systems using a combination of methods and/or procedures written in a plurality of languages.

The CPU 206 in this system has two stack caches 212 and 214, one for the program stack 202 and one for the evaluation stack 204, respectively. The operating system 110 assigns regions of memory 210 for storing the program stack 202 and evaluation stack 204. However, portions of the stack or stacks may be cached in a combined or separate cache arrays on-chip within the CPU 206. The one or more stack caches "spill and fill" from their respective stack regions 202, 204 in memory. The present invention concerns the evaluation stack, regardless of whether it is combined or separate from the stack used for storing method activation records.

In some implementations, the evaluation stack cache 214 can be implemented using a subset of the computer's registers 126.

Figure 2B:
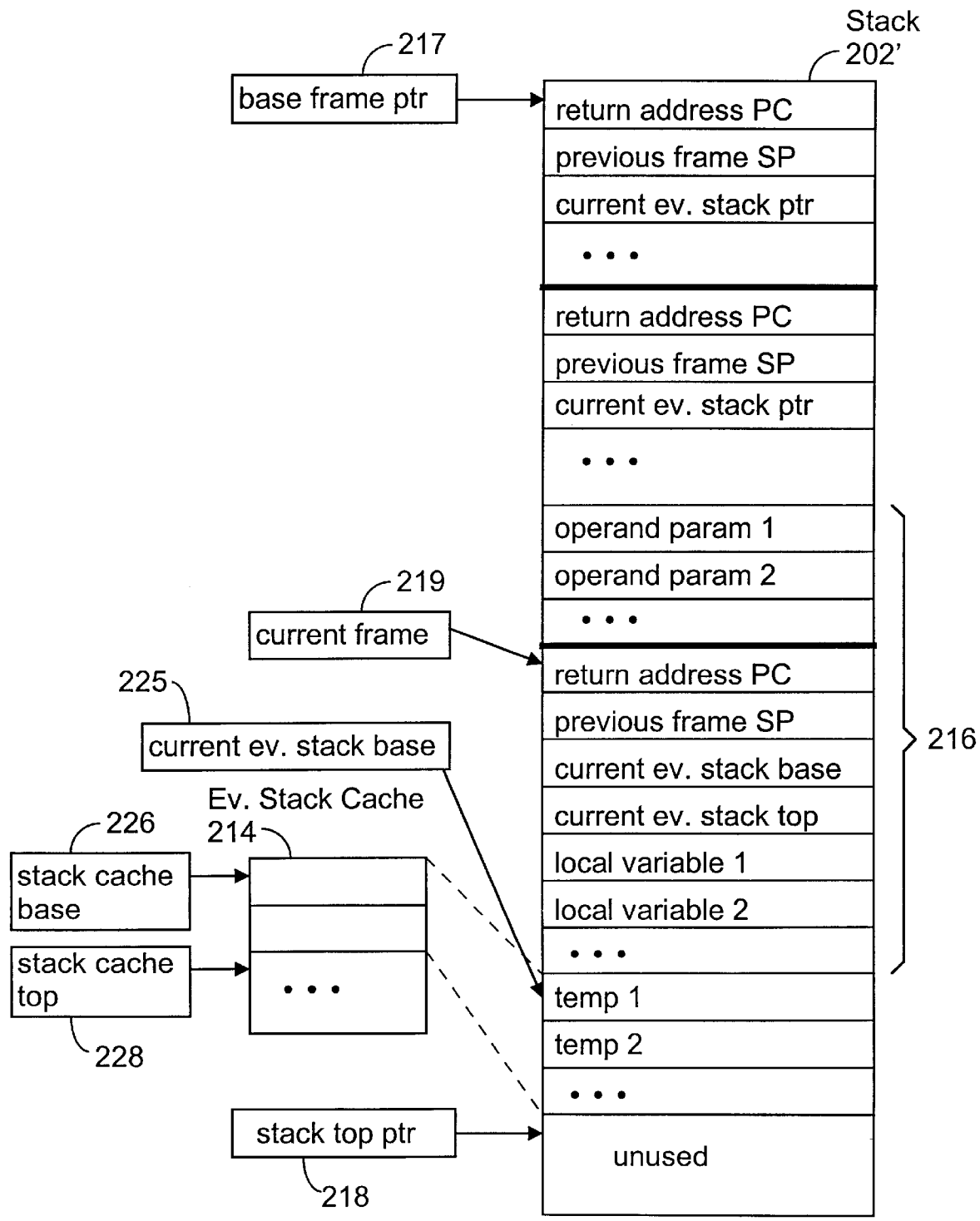
FIG. 2B is block diagram showing the relationship between the stack and the evaluation stack cache in a preferred embodiment.

The evaluation stack cache 214 is essentially a window over the evaluation stack in main memory. FIG. 2B represents a different preferred embodiment in which a single stack 202' is used for both activation records and computation evaluation data. Each time a new method or procedure is called, the calling procedure pushes the operand parameters for the called procedure onto the stack and then makes a method call or invocation. The method call or invocation causes a new stack frame to be formed, and in particular causes the instruction execution logic to push onto the stack a return address program counter value and a pointer to the previous stack frame. The code for initializing the called method then pushes onto the stack the remaining portion of the method's activation record 216, including pointers to the base and top of the current evaluation stack and the local variables used by the method.

Any computational values pushed onto the stack during the execution of the "last unterminated procedure" (i.e., the last procedure or method to be called that has not yet executed a return instruction) are pushed onto the end of the stack frame for that procedure. In this document the final portion of the stack frame is called the evaluation stack, and the evaluation stack base and evaluation stack top pointers in the current stack frame indicate the starting and ending points of the evaluation stack within the current stack frame.

In the preferred embodiment of FIG. 2B, each activation record includes:

a return address program counter value;

a previous stack pointer value (i.e., pointing to the beginning of the preceding stack frame, if any);

a "current evaluation stack base" pointer, which points to the stack location where the first computation evaluation value may be stored in the current stack frame;

a "current evaluation stack top" pointer, which points to the last stack location (if any) where a computation evaluation value has been stored in the current stack frame;

operand parameters associated with the called procedure or method; and local variables associated with the called procedure or method.

Well known prior art variations on how the stack frame is layed out are possible, depending on implementation optimizations and may occur to those skilled in the art.

The discussion here applied equally well to any alternate stack frame layout that allows identification of the start and end of the evaluation stack.

A number of registers are used to manage use of the stack. In particular, registers are used to store:

a base frame pointer 217 that points to the base of the stack;

a stack top pointer 218 that points to the top of the stack (i.e., the beginning of the unused portion of the stack);

a current frame pointer 219 that points to the current stack frame;

a current evaluation stack base pointer 225 (which is a copy of the same value in the current stack frame), which represents the location of the base of the current evaluation stack;

a stack cache base offset 226, representing the offset, if any, from the base of the current evaluation stack to the base of the evaluation stack cache; and a stack cache top offset 228, representing the offset, if any, from the base of the current evaluation stack to the top of the evaluation stack cache.

As shown in FIG. 2B, the activation record 216 for an invoked method (or a called procedure or function) is immediately followed by zero or more temporary values, which are computation values that have been pushed onto the stack. In this preferred embodiment, the evaluation stack cache 214 is used to store only the computation values pushed onto the stack for the current stack frame. Whenever a new procedure call is executed, the contents of the evaluation stack cache are flushed to memory (i.e., to the next unused memory location for the stack) so as to clear the evaluation stack cache for use by the new stack frame. Whenever a procedure exits, the data processor sets its program counter to the return address PC in the current stack frame, the current stack frame is popped from the stack, and the previous stack frame becomes the new current frame. The computational values at the end of the new current stack frame, if any, are brought into the evaluation stack cache 214.

While the preferred embodient shows the stack cache only caching the current frame, in another preferred embodiment the stack cache can store up to N previous frames by any number of implementation dependent mechanisms, including keeping N sets of stack cache base and stack cache top registers to keep track of the current and N-1 prior stack frames, or the compiler always storing and restoring these values for the state of the stack cache in the activation record itself. While the present invention applies equally well to all such embodiments, for simplicity and ease of explanation this document shows the stack cache to only cache the current frame.

Upon invocation of a new method, whether or not the contents of the evaluation stack are flushed to memory also depends on the stack cache organization and policy. In the preferred embodiment described above, a writeback cache with no dirty bits is assumed. However, if the stack cache is designed to be a write through cache, such that all stores into the cache also are written to one or more subsequent data caches or memory (see for example FIG. 3C), there there is no reason to write cache blocks to memory when a new method is invoked (since the previous cache block's contents have already been stored there). Similarly, if stack cache is a writeback cache that has a dirty bit for each cache block to indicate which cache blocks have been written to and which are clean, the clean cache blocks need not be written back to memory during swap out. For purposes of describing the present invention of tagging the evaluation stack we are using the simple embodiment of a writeback stack cache that (A) does not use dirty bits, (B) caches only the current activation record, and (C) upon a method invocation, flushes the evaluation stack cache contents to the evaluation stack in memory.

The remaining portions of the description in this document apply both to implementations using separate program and evaluation stacks and implementations using a combined stack.

Data Type Restrictions on Program Instructions

The present invention assumes that the CPU, or instructions executed by the CPU, are able to determine the data type of every datum written to the evaluation stack. More specifically, it is assumed that the instructions executed by the CPU are sufficiently data type specific that it is possible for the instruction execution logic in the CPU to determine whether or not each datum written to the evaluation stack is an object reference and to set the tag bit of the evaluation stack entry accordingly. Instructions that simply copy data from one stack location to another, or between a register and a stack location, need not be data type specific because the data type of the datum being written can be determined from the tag on the source location.

However, it is noted that some implementations of the Java language include a number of "optimization" or "quick" instructions that are not data type specific. Examples are getfield_quick, getfield_quick_w, getstatic_quick, Idc_quick, Idc_w_quick, putfield_quick, putfield_quick_w, and putstatic_quick. The problem with these instructions are that they may be used on object reference data as well as other types of data such as integers. On the other hand, due to constraints placed on the use of Java instructions by the Java bytecode verifier, each such instruction is either always used to manipulate an object reference, or it never is. Furthermore, the Java bytecode verifier has all the information needed to determine for each such instruction whether or not it is always or never used to manipulate object reference data. Therefore, to implement the present invention in systems where the CPU directly executes Java instructions, it will be necessary for the class loader, or the bytecode verifier called by the class loader, to replace each of these instructions that is to be used with object reference data with a new data type specific version of the respective instruction. For instance, the new instructions for moving object reference data could be called agetfield_quick, agetfield_quick_w, agetstatic_quick, aldc_quick, aldc_w_quick, aputfield_quick, aputfield_quick w, and aputstatic_quick (i.e., the "a" prefix indicates instructions that operate on object reference data). The instruction replacements would preferably be performed during loading of the class file into memory.

The system or software design requirements and techniques for performing such instruction replacements are beyond the scope of this document and do not form a part of the present invention.

Data Structures for Stack Cache and Stack Portion in Main Memory

Figure 3A:
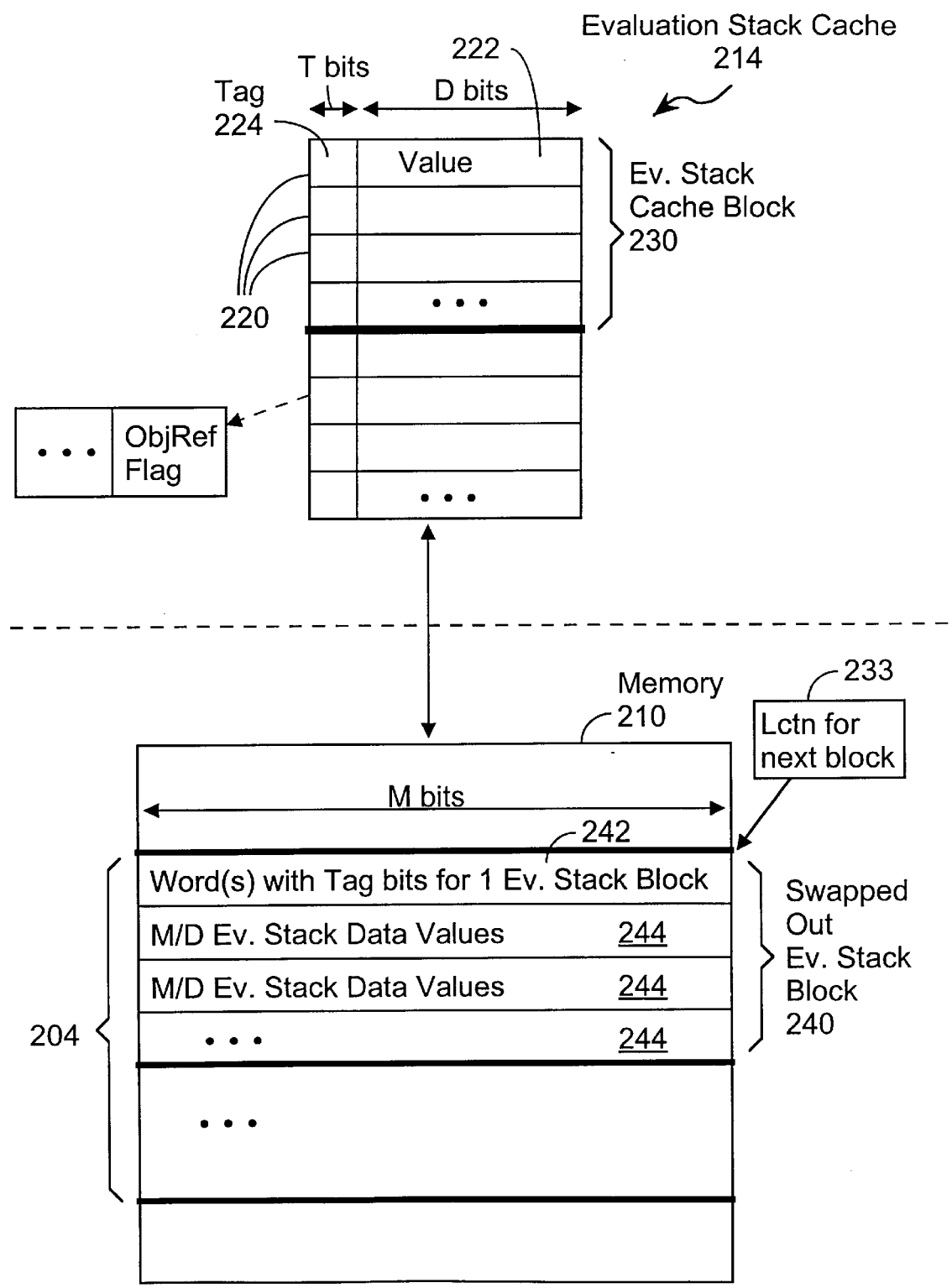
FIGS. 3A, 3B and 3C are block diagrams of a stack cache, and corresponding main memory data structures in first, second and third preferred embodiments of the present invention.

Referring to FIG. 3A, in the preferred embodiment each entry 220 in the evaluation stack cache 214 contains a data portion 222 and a tag portion 224. The data portion 222 of each cache tag entry occupies D data bits, while the tag portion 224 occupies T bits. In a preferred embodiment D is equal to thirty-two and T is equal to one. More generally, D will usually be equal to a integer power of 2 (e.g., 32, 64 or 128), and T is equal to a value of at least one. In the preferred embodiment, evaluation stack cache entries are tagged only to indicate whether or not they are currently storing an object reference (e.g., tag=1 indicates the evaluation stack cache entry is an object reference and tag=0 indicates the evaluation stack cache entry is not an object reference).

The evaluation stack cache 214 preferably stores a plurality of stack cache blocks 230. A stack cache block 230 is the basic unit of storage that is spilled and filled to main memory. The stack cache is spilled and filled from the bottom of the stack cache.

Whenever the evaluation stack cache 214 overflows with entries, a cache block 230 is written to main memory 210 at a location 233 that has been preestablished by the operating system for storage of the next evaluation stack block. In particular, since the stack cache is spilled from the bottom, the memory location to which the bottom stack block is written is offset from the current evaluation stack base pointer 225 by the stack cache base offset 226 (see FIG. 2B).

Swapped out stack cache blocks may or may not be stored in contiguous blocks of main memory. For instance, the operating system may allocate "chunks" of main memory with room for X (e.g., X=127) such stack blocks at a time, with each chunk of allocated memory having room for storing (in addition to X stack blocks) a pointer to the next allocated stack storage chunk in main memory and a pointer to the previous such stack storage chunk. When a single stack is used to capture both activation records and evaluation stack entries, the operating system may allocate single page size chunks of memory for the stack and link them together as needed.

In a first preferred embodiment, each evaluation stack cache block 230 consists of eight 33-bit entries (32 data bits and one tag bit per entry). The memory location words in main memory 210 are also 32-bits long, and when an evaluation stack cache block is stored to memory, the swapped out evaluation stack block 240 occupies nine memory words: one word 242 for storing the tag portions of the eight entries and eight words 244 for storing the data portions. The tag bits can be stored in the tag portion 242 of the swapped out evaluation stack block 240 in any predefined pattern, such as in the first T×N bits of the tag portion 242, where T is the number of bits in each tag and N is the number of entries in an evaluation stack cache block 230.

More generally, if the data portion 222 of each evaluation stack cache entry 220 has D bits and the tag portion 224 of each evaluation stack cache entry has T bits, and each memory word in main memory has M bits (where M is an integer multiple of D), the tag portion 242 of the swapped out stack cache block 240 consists of TX memory words, where TX is equal to RoundUp(N×T/M), and the data portion of the swapped out stack cache block 240 consists of DX memory words, where DX is equal to N×D/M. The function "RoundUp(x)" is equal to x rounded up to the next closest integer (i.e., it is equal to x if x is an integer, and is equal to x+1 if x is not an integer).

In the first preferred embodiment, shown in FIG. 3A, it is assumed that no programs other than the root set locator procedure of the garbage collector ever need to access the contents of the evaluation stack other than the entries at the top of the stack. In other words, it is assumed that random access to the stack contents is not required. As a result, the fact that the Xth entry of the evaluation stack is not at the Xth memory location of the evaluation stack region in main memory is not a problem.

Whenever the evaluation stack cache 214 underflows (i.e., runs out of entries, or alternately a predefined number of blocks 230 in the cache become empty), one or more evaluation stack blocks 240 from main memory are swapped in. As each block 240 is swapped in, the tag bits in the tag portion of the block 240 are written into the tag portions 224 of the entries in an evaluation stack cache block 230, and the data values in the data portion of the block 240 are written into the data portions 222 of the entries in the same evaluation stack cache block 230.

The embodiment shown in FIG. 3A is efficient in that transfer of a cache block 230 to main memory can be performed using a single memory transaction operation to a single memory address, which may take one or more memory cycles depending on the width of the memory data bus.

In an alternate embodiment, each stack cache block 230 is tagged with an additional "dirty bit" that indicates whether or not the contents of the cache tag block have been modified, or equivalently, whether or not the stack cache block may contain data not already stored in memory (or one of its intervening data caches). In this alternate embodiment, stack cache blocks that are to be spilled are simply flushed and not written back to memory if their dirty bit indicates that the stack cache block is clean.

Figure 3B:
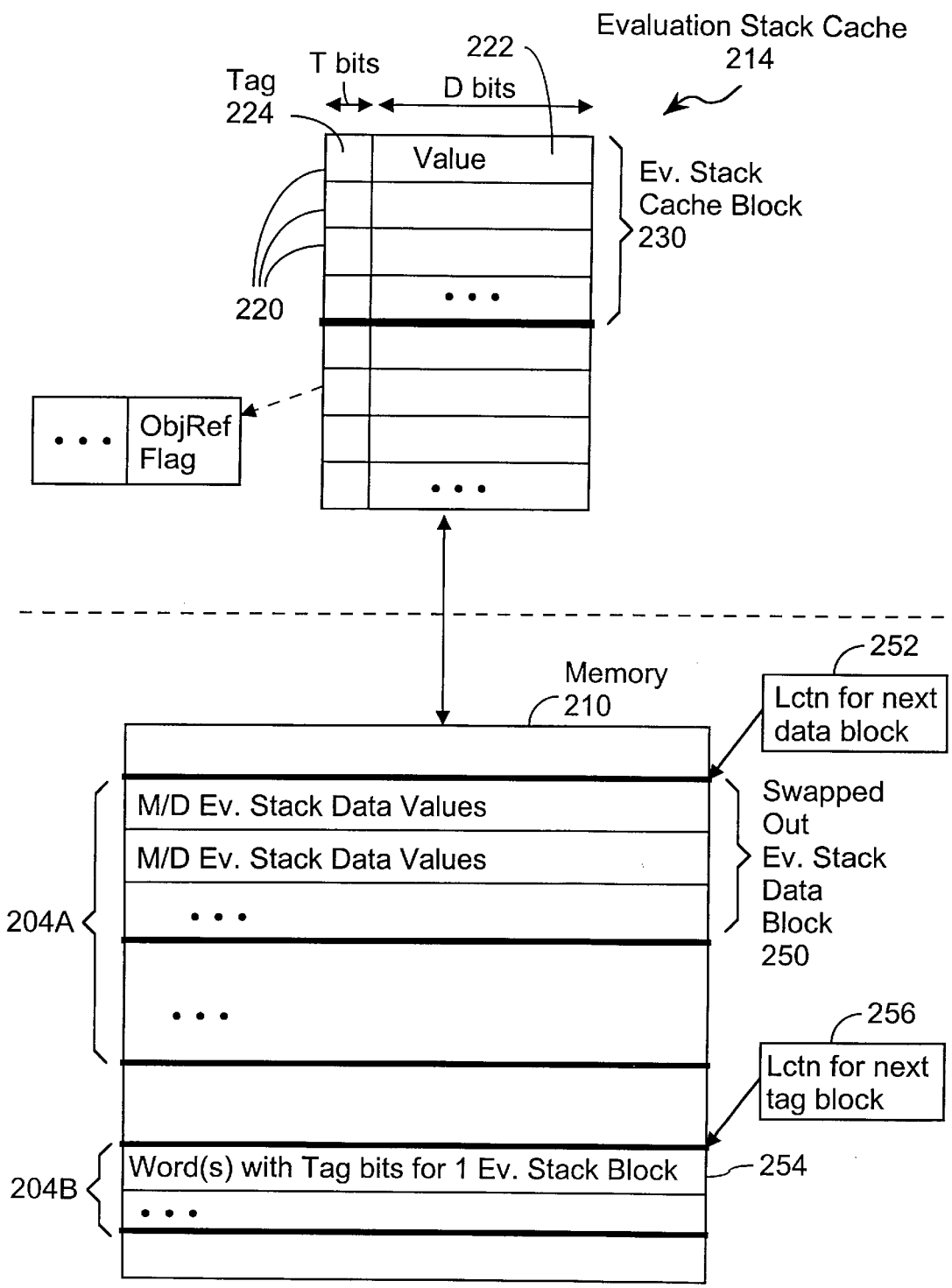

FIG. 3B shows a second preferred embodiment in which the data portions of the entries in each swapped out stack cache block are stored as a data block 250 in a first location 252 in main memory, while the tag portions of the entries in each swapped out stack cache block are stored as a tag block 254 in a second location 256 in main memory. The evaluation stack 204 is, in effect, divided into an evaluation data stack 204A and an evaluation tag stack 204B. This embodiment is logically and functionally equivalent to the one shown in FIG. 3A, but has different performance characteristics. In particular, the embodiment in FIG. 3B is preferred if there are any programs other than the garbage collector's root set locator procedure that require random access to the contents of the evaluation stack, because the location of each stack entry in the swapped out portions of the stack is a simple linear function of the stack entry's "stack location" (i.e., relative to the base of the stack). However, memory access to the swapped out portions of the stack are less efficient in that writing out a block requires to writes to two different regions (204A, 204B) of memory, and reading a swapped out block requires reads to two different regions of memory.

The advantage of the embodiment shown FIG. 3A over the embodiment shown in FIG. 3B is that an entire stack cache block can be transferred to or from main memory in a single memory transaction.

The advantages of the embodiment shown in FIG. 3B over the embodiment shown in FIG. 3A is that stack data can be brought in independently from the tags, and linear addressing is maintained (which can be important for some applications).

Figure 3C:
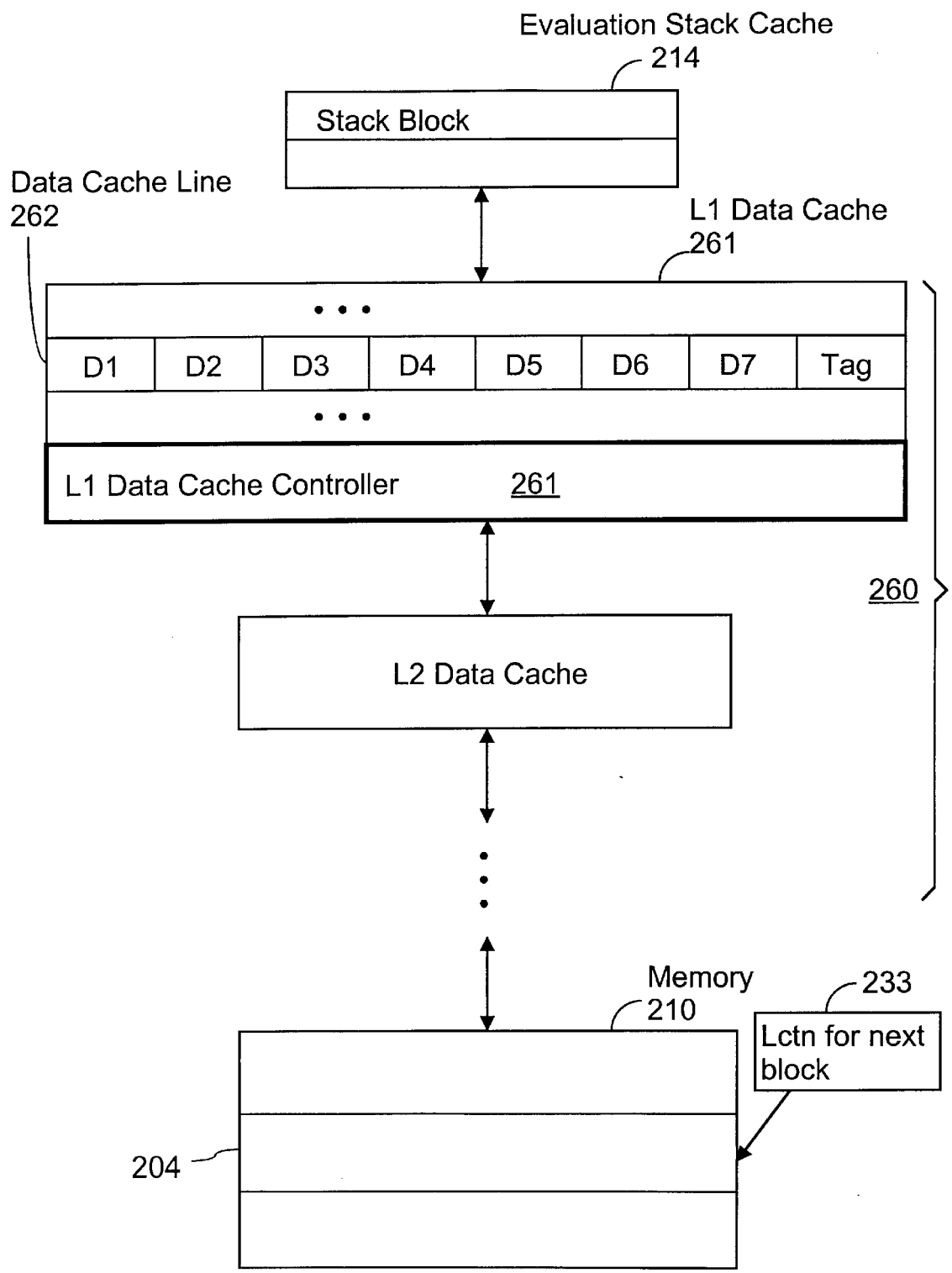

In a third embodiment, shown in FIG. 3C, the stack cache 214 is spilled and filled to and from the CPU's data cache 260. The data cache may include one or more levels of data caches that are interposed between the stack cache and main memory 210, in which case the stack cache will spill/fill into the L1 data cache 261, and the L1 data cache controller 262 will perform the cache miss processing to and from main memory 210 as needed. In this implementation, it is strongly preferred for both the data and tag portions of each stack cache block to be allocated to a single data cache line 262 (i.e., the most basic memory caching unit in the data cache). More specifically, the stack cache block will be written to, and read from, a data cache line associated with the memory location assigned to the corresponding stack block.

For instance, in this embodiment if a data cache line contains eight 32-bit words, each stack cache block will contain seven entries, and thus one word of the corresponding data cache line will store the tags for the seven entries and the other seven words of the data cache line will store the data portions (D1 to D7) of the seven stack cache entries. As a result, the entire stack cache block fits into one data cache line. In this embodiment, the stack cache spill/fill controller can also be combined with the data cache controller. If there is a miss for a stack cache block in the data cache, the data cache controller will efficiently retrieve an entire stack block with a single cache fill operation, because the entire stack block fits in a single data cache line. In alternate versions of the embodiment shown in FIG. 3C, such as systems where the L1 data cache line is relatively small, stack cache blocks may be sized such that each stack cache block is stored in two or more L1 data cache lines.

Note that the data cache tag for each data cache line is not shown in FIG. 3C since it is not relevant to the present discussion. The function of each data cache tag is to indicate what main memory locations are in the corresponding data cache line.

The embodiment of FIG. 3C is similar to the embodiment of FIG. 3A in that only one memory transaction is used to spill or fill a full stack cache block. The advantage of the embodiment of FIG. 3C over the embodiment shown in 3A is that it provides all the standard benefits of data caching.

Stack Cache Spill and Fill State Machines

For the purposes of this document, when the stack cache "overflows" (i.e., reaches a predefined or programmable high water mark of fullness) and "spills" into main memory, a stack cache block is said to be swapped out to main memory. Similarly, when the stack cache "underflows" (i.e., reaches a predefined or programmable low water mark of emptiness), a cache fill operation is performed so as to bring a cache block back from main memory into the stack cache. The cache block is said to be swapped in.

Figure 4A:
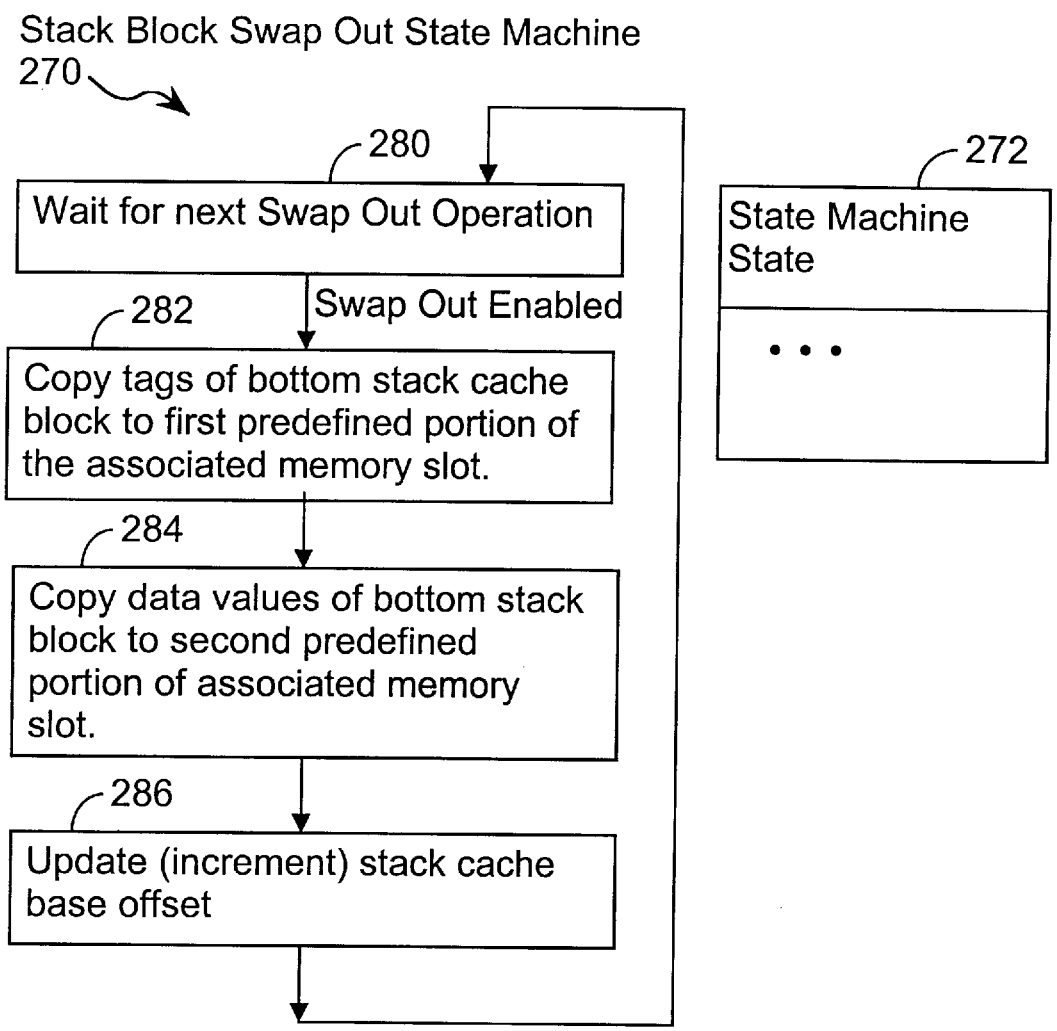
FIGS. 4A and 4B depict state diagrams for a stack block swap out state machine and a stack block swap in state machine, respectively.

Referring to FIGS. 4A and 2B, there is shown a state transition representation of the state machine 270 for swapping out an evaluation stack cache block to main memory. The state machine 270 maintains a number of status values, including the state of the state machine 272 and the stack cache base offset 226 (shown in FIG. 2B). Note that the main memory address for the bottom stack cache block is equal to the current evaluation stack base pointer 225 plus the stack cache base offset 226. The operation of the state machine 270 will first be described with reference to the memory usage configuration shown in FIG. 3A, and then with respect to FIG. 3B.

The state machine 270 remains in a wait state 280 between swap out operations. When a stack cache block swap out operation is enabled, for instance by overflow of the stack cache, the state machine enters state 282, in which it copies the tag portions of the entries in the stack cache block to be swapped out to the first word (or any other predefined word) of "the next available memory slot." The next available memory slot is defined in the preferred embodiments to be the main memory location defined by the current evaluation stack base pointer 225 plus the stack cache base offset 226. More than one main memory word may be used if the total number of bits in the tag portions exceed the number of bits in a memory word.

In state 284, the state machine copies the data portions of the entries in the stack cache block to the next N×(M/D) words of the memory slot, where N is the number of entries per block, M is the number of bits per memory word, and D is the number of data bits per entry. The order of states 282 and 284 can be reversed, so long as the order of the corresponding states (294, 296) of the swap in state machine 290 are similarly reversed. Alternately, states 282 and 284 can be combined into a single state in which a stack cache block is written out to a specified memory location as a single operation.

In state 286 the state machine updates the stack cache base offset 226 by incrementing it to point to the new base entry in the stack cache (i.e., the block after the one just swapped out). The incremented stack cache base offset 226 is also used to determine the main memory location for the new base entry in the stack cache. Then the state machine returns to the wait state 280.

When using the cache block storage configuration of FIG. 3B, the state machine maintains two base pointers and two next slot offsets, one for a data stack region (or slot array) 204A and one for a tag stack region (or slot array) 204B. In state 282 the tag portions of the entries in the stack cache block are copied to the next available slot in the tag stack region 204B, while in state 284 the data portions are copied to the next available slot in the data stack region 204A. In state 286 two offset values are updated, one for the tag stack region 204B and one for the data stack region 204A. In all other respects the state machine 270 is the same for both embodiments.

The operation of the state machine swap out logic is the same for the embodiments in FIGS. 3A and 3C, except that for the embodiment in FIG. 3C each stack block is copied in states 282 and 284 to a data cache line associated with the memory location assigned to the stack block.

If the evaluation stack cache 214 is a writeback cache that maintains a dirty bit for each cache block 230, the swap out logic would be modified to check the dirty bit, and to skip steps 294 and 296 of the state machine when the stack block being swapped out is clean (as denoted by that block's dirty bit).

Figure 4B:
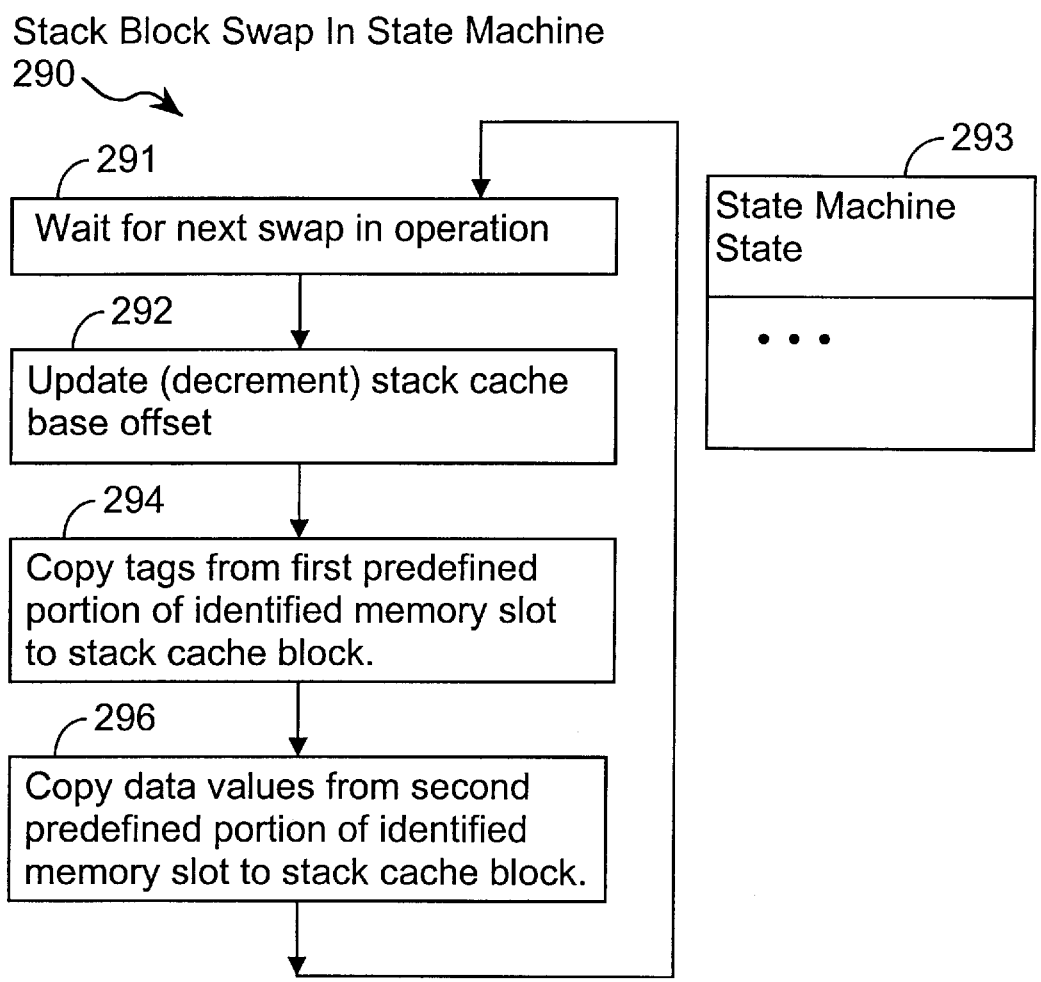

Referring to FIG. 4B, there is shown a state transition representation of the state machine 290 for swapping in an evaluation stack cache block from main memory back into the stack cache. The state machine 290 updates one or more state machine status values 293 and the stack cache offset value 226. The operation of the state machine 290 will first be described with reference to the memory usage configuration shown in FIG. 3A, and then with respect to FIG. 3B.

The state machine 290 remains in a wait state 291 between swap in operations. When a stack cache block swap in operation is enabled, for instance by underflow of the stack cache, the state machine enters state 292, in which it updates the stack cache base offset 226. The updated stack cache base offset 226 points to the location of the new bottom entry in the stack cache and also specifies (in conjunction with the current evaluation stack base pointer 225) the location of the corresponding tag and data values in main memory.

Next, in state 294, the state machine copies the tag portions of the entries in the stack cache block to be swapped in from a first predefined portion of the "identified memory slot". The identified memory "slot" is defined in the preferred embodiment to be the main memory location defined by the current evaluation stack base pointer 225 plus the stack cache base offset 226. The copied tag values are copied into their respective cache entry tag portions.

Next, in state 296, the state machine copies data values from a second predefined portion of the identified memory slot to the data portions of the stack cache block being filled. The order of states 294 and 296 can be reversed. Alternately, states 294 and 296 can be combined into a single state in which a stack cache block is read in from a specified memory location as a single operation. Then the state machine returns to the wait state 290.

When using the cache block storage configuration of FIG. 3B, the state machine 290 uses two base pointers and two next slot offsets, one for a data stack (or slot array) 204A and one for a tag stack (or slot array) 204B. In state 294 the tag portions of the stack cache block are copied from a current identified slot (computed using corresponding base pointer and offset values) in the tag stack region 204B, while in state 294 the data portions are copied from the current identified slot (computed using corresponding base pointer and offset values) in the data stack region 204A. In state 292 two offset values are updated, one for the tag stack region 204B and one for the data stack region 204A. In all other respects the state machine 290 is the same for both embodiments.

The operation of the state machine swap in logic is the same for the embodiments in FIGS. 3A and 3C, except that for the embodiment in FIG. 3C each stack block is copied in from a data cache line associated with the stack cache block's memory location.

Root Set Locator Procedure

Referring to FIGS. 2 and 5, the root set locator procedure 300 in the operation system's garbage collector 302 locates object references in the registers used by the mutator task and adds the located object references to a root set list (310). It also locates object references in the program stack and adds the located object references to the root set list (312). Object references in both the portion of the program stack in cache and the portion in main memory are located. One way that object references can be located in method activation records in the program stack is discussed more fully in copending patent application Ser. No. 08/842,067, filed on Apr. 23, 1997. Furthermore, the root set location procedure locates object references in the evaluation stack and adds the located object references to the root set list (312). For the portion of the evaluation stack in cache, object references are located simply by inspecting the cache entry tags. For the portion of the evaluation stack in main memory, object references are located by inspecting the set of stack entry tag values stored in memory for each block of stack entries stored in memory.

The order of the steps of root set locator procedure is not important and thus may vary from that shown in FIG. 5.

Alternate Embodiments

In an alternate embodiment, a single stack is used for storing both calculation values and method invocation records. The portion of the stack stored in cache is tagged so as to indicate which entries in the stack cache are object references. In this alternate embodiment, the stack cache caches the last N entries of the main stack, and thus can cache multiple frames. The stack cache management logic simply spills and fills the last N entries of the main stack, without regard to stack frame boundaries.

The portions of the stack stored in main memory are also indirectly tagged in that for each block of stack entries swapped out to main memory, the tag portions are preferably stored in a parallel slot in a portion of main memory used for storing the tag portions of swapped out stack blocks (as shown in FIG. 3B). The parallel storage of stack data and tags is preferred in this alternate embodiment because it facilitates linear random access addressing of the stack contents, which is necessary for some software operations. However, with proper address conversion management, it would be possible to store the stack data type tags in the same "slot" of main memory allocated to each stack block.

In another alternate embodiment, the evaluation stack cache is used to store the last N entries of the evaluation stack, regardless of which stack frame they belong to. In this way the evaluation stack is contiguous in main memory.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of operating a computer system, comprising the steps of:

maintaining a stack for storing data related to computational operations;

storing at least a portion of the stack in a stack cache, and storing any other portions of the stack in an untagged main memory in the computer system;

the stack cache including a set of stack entries stored in an array of stack cache memory locations, each stack entry and each stack cache memory location having a respective data portion and a respective tag portion, the tag portion of each stack entry comprising a tag indicating whether a data value, if any, in the data portion of the stack entry comprises an object reference;

whenever a predefined stack cache fullness condition occurs, copying a stack cache block of N stack entries to a previously established main memory location, including copying the data values and tags in N stack entries of the stack cache to the previously established main memory location, where N is an integer greater than 1, including storing the N tags in the N copied stack entries into a first predefined portion of the previously established main memory location, and storing the N data values in the N copied stack entries into a second predefined portion of the previously established main memory location; wherein the first and second predefined portions of the previously established main memory location each occupies a contiguous set of one or more memory words distinct from the memory words occupied by the other predefined portion;

whenever a portion of the stack not presently located in the stack cache is needed for computational processing, copying a stack cache block of N stack entries from a corresponding main memory location to the stack cache, including copying N tags in the first portion of the corresponding main memory location into the tag portions of N respective stack cache memory locations and copying N data values in the second portion of the corresponding main memory location into the data portions of the N respective stack cache memory locations.

2. The method of claim 1, wherein the data portion of each stack cache memory location has D bits and the tag portion of each stack cache memory location has T bits;

the previously established main memory location consists of a contiguous set of memory words, each memory word having a number of bits M that is an integer multiple of D, the first predefined portion of the previously established main memory location consisting of TX memory words, where TX is equal to RoundUp (N×T/M), and the second predefined portion of the previously established main memory location consisting of DX memory words, where DX is equal to N×D/M.

3. The method of claim 2, wherein TX is equal to 1.

4. The method of claim 2, wherein the previously established main memory location consists a set of TX+DX contiguous locations in a previously established non-cache stack array in the main memory.

5. The method of claim 2, wherein the previously established main memory location consists a set of TX contiguous locations in a previously established non-cache stack tag array in the main memory and a set of DX contiguous locations in a previously established non-cache stack data array in the main memory.

6. The method of claim 1, further including:

while performing garbage collection, generating a root set of pointers, including locating all object references stored in the stack by determining which entries, if any, in the stack have a tag indicating that the corresponding data value in that stack cache entry is an object reference.

7. The method of claim 6, the locating step including determining which entries, if any, in the stack cache have a tag indicating that the corresponding data value in that stack cache entry is an object reference and which entries in the portion, if any, of the stack in main memory have a tag indicating that the corresponding data value in that stack cache entry is an object reference.

8. The method of claim 1, wherein the step of copying a stack cache block of N stack entries to a previously established main memory location comprises copying the stack cache block to a data cache line in a data cache, the data cache line corresponding to the main memory location; and the step of copying a stack cache block from a corresponding main memory location to the stack cache comprises copying the stack cache block from a data cache line in a data cache, the data cache line corresponding to the main memory location.

9. A computer system, comprising:

data processing logic for executing instructions in computer programs, including invoked methods; the data processing logic performing computational operations specified in the instructions being executed;

a stack for storing data related to the computational operations;

an untagged main memory, coupled to the data processing logic;

the data processing logic including a stack cache for storing at least a portion of the stack, wherein any other portions of the stack are stored in the main memory;

the stack cache including a set of stack entries stored in an array of stack cache memory locations, each stack entry and each stack cache memory location having a respective data portion and a respective tag portion, the tag portion of each stack entry comprising a tag indicating whether a data value, if any, in the data portion of the stack entry comprises an object reference;

a stack state machine for moving stack entries between the stack cache and main memory;

the stack state machine including swap out logic for copying the data values and tags in at least a subset of the stack entries in the stack cache to a previously established main memory location, including copying the data values and tags in N stack entries of the stack cache to the previously established main memory location, where N is an integer greater than 1, including storing the N tags in the N copied stack entries into a first predefined portion of the previously established main memory location, and storing the N data values in the N copied stack entries into a second predefined portion of the previously established main memory location; wherein the first and second predefined portions of the previously established main memory location each occupies a contiguous set of one or more memory words distinct from the memory words occupied by the other predefined portion;

the stack state machine including swap in logic for copying a set of N stack entries from a corresponding main memory location to the stack cache, including copying N tags in the first portion of the corresponding main memory location into the tag portions of N respective stack cache memory locations and copying N data values in the second portion of the corresponding main memory location into the data portions of the N respective stack cache memory locations.

10. The computer system of claim 9, wherein the data portion of each stack cache memory location has D bits and the tag portion of each stack cache memory location has T bits;

the previously established main memory location consists of a contiguous set of memory words, each memory word having a number of bits M that is an integer multiple of D, the first predefined portion of the previously established main memory location consisting of TX memory words, where TX is equal to RoundUp (N×T/M), and the second predefined portion of the previously established main memory location consisting of DX memory words, where DX is equal to N×D/M.

11. The computer system of claim 10, wherein TX is equal to 1.

12. The computer system of claim 10, wherein the previously established main memory location consists a set of TX+DX contiguous locations in a previously established non-cache stack array in the main memory.

13. The computer system of claim 10, wherein the previously established main memory location consists a set of TX contiguous locations in a previously established non-cache stack tag array in the main memory and a set of DX contiguous locations in a previously established non-cache stack data array in the main memory.

14. The computer system of claim 9, further including:
a garbage collection root set location procedure, executed by the data processing logic, that locates all object references stored in the stack by determining which entries, if any, in the stack have a tag indicating that the corresponding data value in that stack cache entry is an object reference.

15. The computer system of claim 14, wherein the root set location procedure determines which entries, if any, in the stack cache have a tag indicating that the corresponding data value in that stack cache entry is an object reference and which entries in the portion, if any, of the stack in main memory have a tag indicating that the corresponding data value in that stack cache entry is an object reference.

16. The computer system of claim 9, wherein
the stack state machine swap out logic copies a stack cache block of N stack entries to a data cache line in a data cache, the data cache line corresponding to the main memory location; and
the stack state machine swap in logic copies a stack cache block from a data cache line in a data cache, the data cache line corresponding to the main memory location.

17. A method of operating a computer system, comprising the steps of:
maintaining a program stack for storing data related to invoked methods and an evaluation stack for storing data related to computational operations;
storing at least a portion of the evaluation stack in an evaluation stack cache, and storing any other portions of the evaluation stack in an untagged main memory in the computer system;
the evaluation stack cache including a set of evaluation stack entries stored in an array of evaluation stack cache memory locations, each evaluation stack entry and each evaluation stack cache memory location having a respective data portion and a respective tag portion, the tag portion of each evaluation stack entry comprising a tag indicating whether a data value, if any, in the data portion of the evaluation stack entry comprises an object reference;
whenever a predefined evaluation stack cache fullness condition occurs, copying the data values and tags in at least a subset of the evaluation stack entries in the evaluation stack cache to a previously established location main memory in the computer system, including copying the data values and tags in N evaluation stack entries of the evaluation stack cache to the previously established main memory location, where N is an integer greater than 1, including storing the N tags in the N copied evaluation stack entries into a first predefined portion of the previously established main memory location, and storing the N data values in the N copied evaluation stack entries into a second predefined portion of the previously established main memory location; wherein the first and second predefined portions of the previously established main memory location each occupies a contiguous set of one or more memory words distinct from the memory words occupied by the other predefined portion;
whenever a portion of the evaluation stack in the main memory is needed for computational processing, copying a set of N evaluation stack entries from a corresponding main memory location to the evaluation stack cache, including copying N tags in the first portion of the corresponding main memory location into the tag portions of N respective evaluation stack cache memory locations and copying N data values in the second portion of the corresponding main memory location into the data portions of the N respective evaluation stack cache memory locations.

18. A computer system, comprising:
data processing logic for executing instructions in computer programs, including invoked methods; the data processing logic performing computational operations specified in the instructions being executed;
a program stack for storing data related to the invoked methods and an evaluation stack for storing data related to the computational operations;
an untagged main memory, coupled to the data processing logic;
the data processing logic including an evaluation stack cache for storing at least a portion of the evaluation stack, wherein any other portions of the evaluation stack are stored in the main memory;
the evaluation stack cache including a set of evaluation stack entries stored in an array of evaluation stack cache memory locations, each evaluation stack entry and each evaluation stack cache memory location having a respective data portion and a respective tag portion, the tag portion of each evaluation stack entry comprising a tag indicating whether a data value, if any, in the data portion of the evaluation stack entry comprises an object reference;
an evaluation stack state machine for moving evaluation stack entries between the evaluation stack cache and main memory;
the evaluation stack state machine including swap out logic for copying the data values and tags in at least a subset of the evaluation stack entries in the evaluation stack cache to a previously established main memory location, including copying the data values and tags in N evaluation stack entries of the evaluation stack cache to the previously established main memory location, where N is an integer greater than 1, including storing the N tags in the N copied evaluation stack entries into a first predefined portion of the previously established main memory location, and storing the N data values in the N copied evaluation stack entries into a second predefined portion of the previously established main memory location; wherein the first and second predefined portions of the previously established main memory location each occupies a contiguous set of one or more memory words distinct from the memory words occupied by the other predefined portion;
the evaluation stack state machine including swap in logic for copying a set of N evaluation stack entries from a corresponding main memory location to the evaluation stack cache, including copying N tags in the first portion of the corresponding main memory location into the tag portions of N respective evaluation stack cache memory locations and copying N data values in the second portion of the corresponding main memory location into the data portions of the N respective evaluation stack cache memory locations.

\* \* \* \* \*